US011880170B2

(12) United States Patent
Lagorgette

(10) Patent No.: US 11,880,170 B2
(45) Date of Patent: Jan. 23, 2024

(54) WATCH WITH ANNUAL CALENDAR SETTING AND METHOD THEREFOR

(71) Applicant: ETA SA Manufacture Horlogère Suisse, Grenchen (CH)

(72) Inventor: Pascal Lagorgette, Bienne (CH)

(73) Assignee: ETA SA Manufacture Horlogère Suisse, Grenchen (CH)

( * ) Notice: Subject to any disclaimer, the term of this patent is extended or adjusted under 35 U.S.C. 154(b) by 288 days.

(21) Appl. No.: 17/234,888

(22) Filed: Apr. 20, 2021

(65) Prior Publication Data

US 2021/0397135 A1 Dec. 23, 2021

(30) Foreign Application Priority Data

Jun. 18, 2020 (EP) .................................... 20180688

(51) Int. Cl.
*G04C 17/00* (2006.01)
*G04C 9/08* (2006.01)

(52) U.S. Cl.
CPC ........... *G04C 17/0066* (2013.01); *G04C 9/08* (2013.01)

(58) Field of Classification Search
CPC ..... G04B 19/241; G04C 9/08; G04C 17/0066
See application file for complete search history.

(56) References Cited

U.S. PATENT DOCUMENTS 3,992,868 A * 11/1976 Tamaru .................... G04C 3/14 968/170
5,093,814 A 3/1992 Besson et al.
5,299,177 A * 3/1994 Koch ........................ G04C 3/14 368/80
2007/0153635 A1 7/2007 Burkhardt et al.
2016/0320754 A1 11/2016 Lagorgette et al.
2016/0378063 A1* 12/2016 Yoshida ............. G04C 17/0066 368/34
2018/0157215 A1 6/2018 Kissling

FOREIGN PATENT DOCUMENTS

| | | | |
|---|---|---|---|
| CN | 1339725 | A | 3/2002 |
| CN | 208689379 | U | 4/2019 |
| EP | 2 887 158 | A1 | 6/2015 |
| JP | 2016-142546 | A | 8/2016 |
| JP | 2017-501410 | A | 1/2017 |
| JP | 2017-509890 | A | 4/2017 |
| JP | 2018-91841 | A | 6/2018 |

(Continued)

OTHER PUBLICATIONS

European Search Report dated Oct. 20, 2020 in European Application 20180688.2 filed on Jun. 18, 2020, 3 pages (with English Translation of Categories of Cited Documents).

(Continued)

*Primary Examiner* — Renee S Luebke
(74) *Attorney, Agent, or Firm* — Oblon, McClelland, Maier & Neustadt, L.L.P.

(57) ABSTRACT

A watch with annual calendar setting, the watch including at least one setting member configured to displace an hour hand and/or a minute hand, at least one detecting member configured to detect the date change, and at least one central processing unit configured to deduce the set date, to actuate the motor and to implement the annual calendar setting method.

10 Claims, 2 Drawing Sheets

(56) References Cited

FOREIGN PATENT DOCUMENTS

| | | | |
|---|---|---|---|
| KR | 10-2018-0062945 | A | 6/2018 |
| WO | WO 2015/091248 | A2 | 6/2015 |

OTHER PUBLICATIONS

Combined Chinese Office Action and Search Report dated Jul. 11, 2022 in Patent Application No. 202110666418.6 (with partially summarized English language translation and English translation of Category of Cited Documents), 17 pages.
Japanese Office Action dated May 17, 2022 in Japanese Patent Application No. 2021-083637 (with English translation), 5 pages.
Korean Office Action dated Jun. 29, 2023 in Korean Patent Application No. 10-2021-0067246 (with English translation), 13 pages.

* cited by examiner

WATCH WITH ANNUAL CALENDAR SETTING AND METHOD THEREFOR

CROSS-REFERENCE TO RELATED APPLICATION

This application claims priority to European Patent Application No. 20180688.2 filed on Jun. 18, 2020, the entire disclosure of which is hereby incorporated herein by reference.

TECHNICAL FIELD

The present invention relates to electronic watches and more particularly to quartz watches provided with an annual calendar, preferably a perpetual calendar.

TECHNOLOGICAL BACKGROUND

The vast majority of commercially available watches have a calendar that can be set by the user. However, this calendar must be set at the end of each month or after replacing a battery.

Solutions exist that call for the use of a multitude of sensors, which increases the production cost, the production time and the failure probability.

SUMMARY OF THE INVENTION

To this end, the present invention proposes overcoming all or part of the aforementioned drawbacks by means of an annual or perpetual calendar setting method for a watch; said watch comprising an hour hand, a minute hand, at least one setting member, at least one detecting member (180) and at least one central processing unit for implementing said annual or perpetual calendar setting method; said annual or perpetual calendar setting method comprising at least one step of:

- Setting said current date using said at least one setting member;
- Detecting a date change;
- Updating the displayed date;
- Deducing said set date;
- Storing said set date in memory.

Thanks to this disposition, the annual calendar can be set without using a sensor specifically dedicated thereto.

According to one embodiment, said current date comprises a day of the month, a month and/or a year.

Thanks to this disposition, said current date comprises the information required to establish an annual calendar or a perpetual calendar.

According to one embodiment, said date change comprises rotating the motor of said hour hand and/or of said minute hand until a date change occurs.

According to one embodiment, said date change is detected by a change in the torque of said motor.

Thanks to either one of the above dispositions, said current date set can be deduced from the number of revolutions.

According to one embodiment, said setting comprises a step of positioning said hour hand to indicate said day of the month or said month, and/or a step of positioning said minute hand to indicate said month or said day of the month.

Thanks to this disposition, said day of the month and/or said month of said current date can be indicated.

The present invention relates to a watch with annual calendar setting comprising at least:

- One setting member: said at least one setting member being configured to displace an hour hand and/or a minute hand;
- One detecting member: said at least one detecting member being configured to detect said date change; and,
- One central processing unit; said at least one central processing unit being configured to deduce said set date, to actuate said motor and to implement the annual or perpetual calendar setting method according to any one of the preceding claims.

Thanks to this disposition, the annual calendar can be set without using a sensor specifically dedicated thereto.

BRIEF DESCRIPTION OF THE FIGURES

The invention will be described in more detail hereafter using the accompanying drawings, given by way of examples that are in no way limiting, wherein.

DETAILED DESCRIPTION OF THE INVENTION

Figure 1:
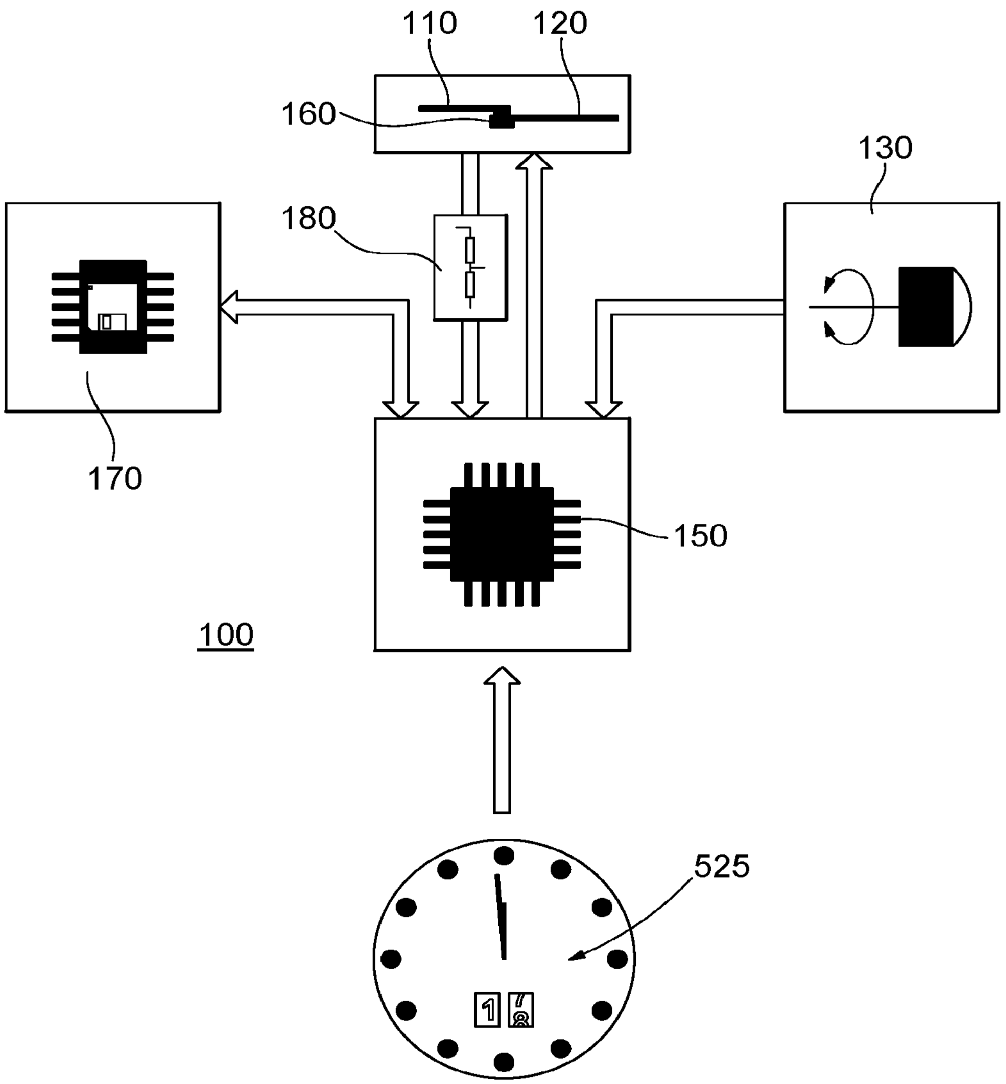
FIG. 1 shows a watch 100 with annual calendar setting according to one embodiment.

The present invention relates to a watch 100, FIG. 1, with annual calendar setting that does not use a sensor specifically dedicated thereto. More specifically, some watches comprise an optical sensor for Flash Setting. The present invention proposes a perpetual calendar without Flash Setting or other setting means, and without adding additional sensors. To this end, said watch 100, according to the invention, comprises at least one setting member 130, preferably a crown 130, configured to displace an hour hand 110 and/or a minute hand 120 and thus indicate or set 510 the current date 515. The "current date 515" or "set date 515" is understood to mean the day on which the watch is set.

Figure 2:
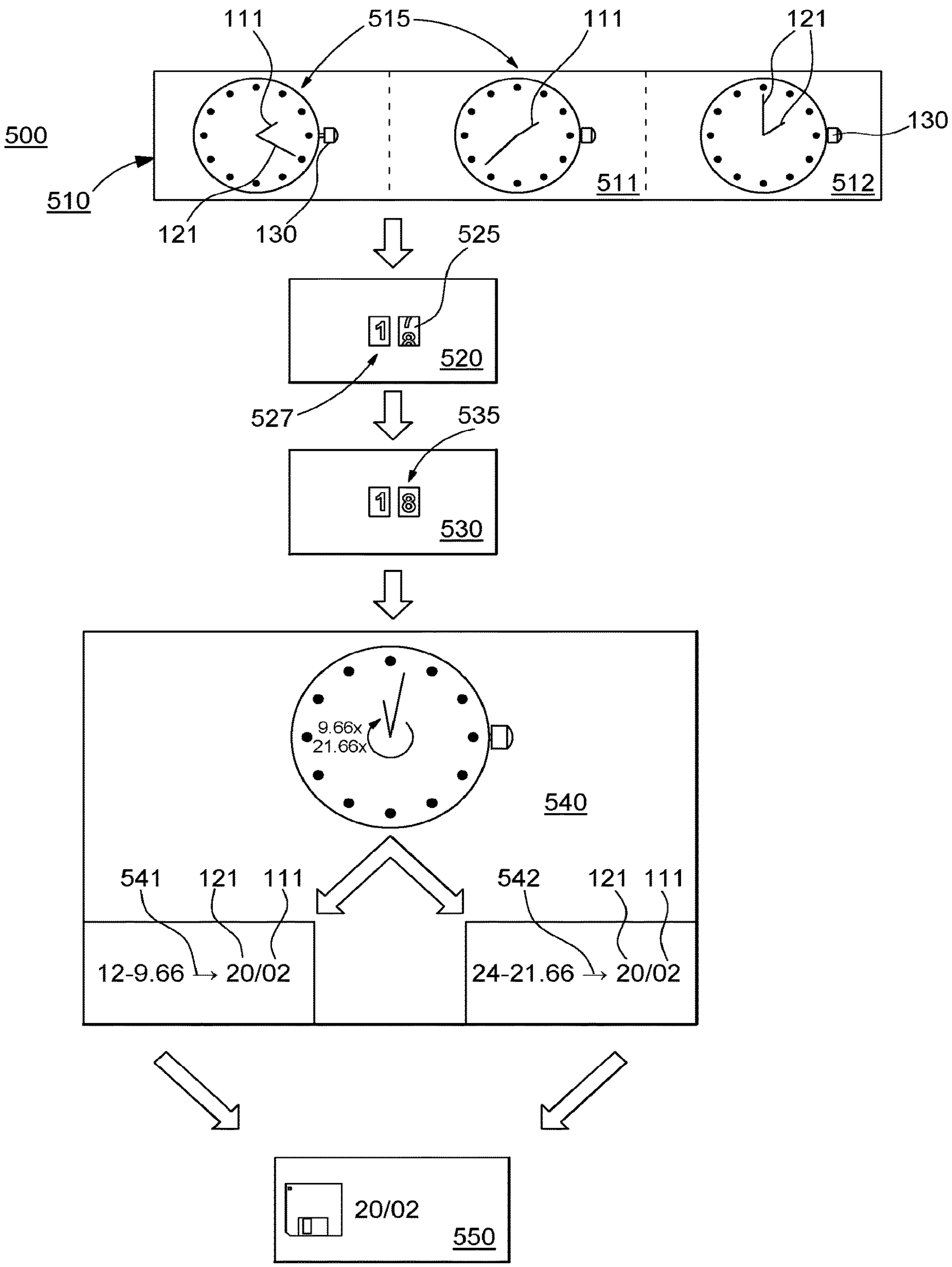
FIG. 2 shows an annual or perpetual calendar setting method 500 for said watch 100 according to one embodiment.

Said watch 100 further comprises at least one central processing unit 150 configured to deduce said set date 515, to actuate a motor 160, preferably a horological movement 160, and to implement an annual or perpetual calendar setting method 500 according to one embodiment shown in FIG. 2, after replacing a battery or when changing time zone for example. More specifically, when said at least one setting member 130 is pulled out, said watch 100 implements said annual or perpetual calendar setting method 500.

One step of said annual or perpetual calendar setting method 500 comprises at least one setting 510 of said current date 515 by said at least one setting member 130. Said setting 510 of said current date 515 takes place using said at least one setting member 130, thus displacing said hour hand 110 and said minute hand 120.

When the user is looking to set 510 said current date 515, i.e. the $20^{th}$ of February, the user manoeuvres said at least one setting member 130 so as to dispose said hour hand 110 over the index "2", which represents a month 111, in this case the month of February, and said minute hand 120 over the index "4", i.e. 20 minutes, which represents a date 121, in this case the day 121 of the month 111, as shown in FIG. 2, which results in "2:20".

Said setting 510 can, according to another embodiment, take place in 2 phases: indication of the month 511 with said hour hand 110 in a first phase, i.e. by indicating the index "2", and in a second phase, indication 512 of the day of the month using said hour hand 110 to indicate the tens digit, in this case "2", and said minute hand 120 to indicate the units digit, in this case "0", i.e. the index "12".

It goes without saying that said setting 510 can, according to another embodiment, take place in 2 phases: the user firstly manoeuvres said at least one setting member 130 so as to dispose said hour hand 110 over the index "2", which represents a month 111, in this case the month of February, and said minute hand 120 over the index "4", i.e. 20 minutes, and secondly indicates the year, for example 2020, by omitting the thousands and hundreds digits and by using said hour hand 110 to indicate the tens digit, in this case "2", and said minute hand 120 to indicate the units digit, in this case "0", i.e. the index "12", such that the calendar setting method is perpetual 500 and not only annual.

Once said current date 515 has been set 510, the user presses in said at least one setting member 130 and said at least one central processing unit 150 detects that the setting process is complete and rotates said hands 110, 120 in a forwards direction until detecting the 24 h revolution pip, preferably representing an updating 530 of the displayed date 535.

Said horological movement 160, such as the Fox 160 or MinETA 160 movement, rotates 527 said hour hand 110 and/or said minute hand 120 until a date change 525 occurs.

Said horological movement 160 is associated with a central processing unit 150, preferably the IC 955X 150 or 955X 150, and with at least one detecting member 180 configured to detect said date change 525.

More specifically, said at least one detecting member 180 can preferably take the form of a conventional divider bridge and thus said at least one central processing unit 150, connected to said at least one detecting member 170, detects 520 a torque change through the power consumption of said motor 160.

This torque change involves, for example, an increase in the duration of the pulses because when said motor 150 drives the date disc 527, the torque increases, resulting in an increase in the length of the motor pulses, and thus said at least one detecting member 180 detects 520 said date change 525 through a change in the torque of said motor 160 and/or an increase in the power consumption of said motor 160.

Thus, the date change 525, i.e. the date leap of the horological movement causes said torque to rise and then fall abruptly when the leap of the date disc 527 occurs, i.e. when the displayed date 535 is updated 530. Said updating 530 of the displayed date 535 procures a 24-hour reference point, since the user does not know whether said set date 515, on said watch 100, for example "2:20", is "ante meridiem", i.e. "before noon" and thus "2:20", or "post meridiem", i.e. "after noon" thus "14:20". Therefore, the updating 530 of the displayed date 535 gives the user a 24-hour reference point.

It is this updating 530 of the displayed date 535 that allows said at least one central processing unit 150 to deduce 540 said set date 515 by counting the number of steps taken by the motor up to said updating 530 of the displayed date 535.

More specifically, if the number of steps, or revolutions taken by the motor to reach said updating 530 of the displayed date 535 is 9.66 revolutions, said at least one central processing unit 150 deduces 541 that said set date 515 was the $20^{th}$ of February, and if the number of revolutions taken to reach said updating 530 of the displayed date 535 is 21.66 revolutions, said at least one central processing unit 150 reaches the same conclusion and deduces 542 that said set date 515 was also the $20^{th}$ of February.

Said set date 515 is thus stored 550 in a memory 170 comprised in said at least one central processing unit 150 or in said watch 100. In other words, said at least one central processing unit 150 counts the exact number of revolutions performed, and thus deduces 540, 541, 542 the set time, and thus defines the month and the day.

Thus, said annual or perpetual calendar setting method 500 for a watch 100 dispenses with the need for an additional interface or sensors to set the date, or for a smartphone or ancillary device to program the date.

The invention claimed is:

1. An annual or perpetual calendar setting method for a watch, the watch comprising an hour hand, a minute hand, a setting member, and processing circuitry configured to implement the annual or perpetual calendar setting method, the annual or perpetual calendar setting method comprising:

setting a current date, including a month and a day of the month, by positioning at least one of the hour hand and the minute hand using the setting member;

causing, by the processing circuitry, rotation of the minute hand by an amount of rotation, which is measured by the processing circuitry, that causes a date displayed by the watch to change due to the amount of rotation;

determining, by the processing circuitry, the set current date based on the measured amount of rotation that caused the date change to occur; and storing the set current date in a memory.

2. The annual or perpetual calendar setting method according to claim 1, wherein the set current date further comprises a year.

3. The annual or perpetual calendar setting method according to claim 1, wherein the causing step comprises rotating a motor of the hour hand and/or of the minute hand until the date change occurs.

4. The annual or perpetual calendar setting method according to claim 3, wherein the causing step further comprises detecting a change in a torque of said motor.

5. The annual or perpetual calendar setting method according to claim 1, wherein the setting step further comprises positioning the hour hand to indicate the month, and positioning the minute hand to indicate the day of the month.

6. A watch, comprising:

the setting member configured to displace the hour hand and/or the minute hand;

a detecting member configured to detect the date change; and the processing circuitry configured to determine the set current date, actuate a motor, and implement the annual or perpetual calendar setting method according to claim 1.

7. The method of claim 1, wherein the causing step comprises detecting a number of revolutions of the minute hand until the date change occurs, and the determining step comprises determining the set current date based on the detected number of revolutions.

8. The method of claim 1, further comprising:

displaying the date; and changing the displayed date when the date change occurs due to rotation of the minute hand caused by the processing circuitry.

9. An annual or perpetual calendar setting method for a watch, the watch comprising an hour hand, a minute hand, a setting member, a detecting member, and processing circuitry configured to implement the annual or perpetual calendar setting method, the annual or perpetual calendar setting method comprising:

setting a current date by positioning at least one of the hour hand and the minute hand using the setting member;

causing, by the processing circuitry, rotation of the minute hand by an amount of rotation that causes a date change to occur;

determining, by the processing circuitry, the set current date based on the amount of rotation that caused the date change to occur; and storing the set current date in a memory, wherein the causing step comprises detecting, as the amount of rotation, a number of revolutions of the minute hand until the date change occurs, and the determining step comprises determining the set current date based on the detected number of revolutions.

10. An annual or perpetual calendar setting method for a watch, the watch comprising an hour hand, a minute hand, a setting member, a detecting member, and processing circuitry configured to implement the annual or perpetual calendar setting method, the annual or perpetual calendar setting method comprising:

setting a current date by positioning at least one of the hour hand and the minute hand using the setting member;

causing, by the processing circuitry, rotation of the minute hand by an amount of rotation that causes a date change to occur;

determining, by the processing circuitry, the set current date based on the amount of rotation that caused the date change to occur; and storing the set current date in a memory, wherein the causing step comprises detecting, as the amount of rotation, a number of revolutions of the minute hand until the date change occurs.

* * * * *